United States Patent [19]

Ohmagari

[11] Patent Number: 4,930,141
[45] Date of Patent: May 29, 1990

[54] MULTI-PHASE PSK MODULATION APPARATUS

[75] Inventor: Shinichi Ohmagari, Tokyo, Japan

[73] Assignee: NEC Corporation, Tokyo, Japan

[21] Appl. No.: 226,012

[22] Filed: Jul. 29, 1988

[30] Foreign Application Priority Data

Jul. 31, 1987 [JP] Japan .................................. 62-190127

[51] Int. Cl.$^5$ ............................................ H04L 25/49
[52] U.S. Cl. ........................................ 375/60; 375/67; 332/107; 332/103
[58] Field of Search ...................... 375/20, 110, 14, 38, 375/60, 67; 370/20, 6; 332/37 R, 37 D, 103–105, 106, 107; 455/109, 126

[56] References Cited

U.S. PATENT DOCUMENTS

| | | | |
|---|---|---|---|
| 4,462,001 | 7/1984 | Girard | 330/149 |
| 4,483,009 | 11/1984 | Honda et al. | 375/14 |
| 4,736,170 | 4/1988 | Wu et al. | 332/21 |

Primary Examiner—Benedict V. Safourek
Assistant Examiner—T. Bocure
Attorney, Agent, or Firm—Sughrue, Mion, Zinn, Macpeak & Seas

[57] ABSTRACT

A multi-phase PSK modulation apparatus includes a multi-phase PSK modulator and baseband signal modification circuitry which modifies the baseband signal in accordance with modulation frequencies to correct all or a portion of any offset error, amplitude error and orthogonality errors. The baseband signal modification circuitry permits error correction over a wide range of frequencies using a rather simple arrangement. In addition, spurious outputs, volume and cost of the apparatus are reduced.

1 Claim, 5 Drawing Sheets

PRIOR ART

MULTI-PHASE PSK MODULATION APPARATUS

BACKGROUND OF THE INVENTION

1. Field of the Invention

The present invention relates to a multi-phase phase-shift keying (PSK) modulation apparatus, particularly a four-phase PSK modulation apparatus which can be used in a wide frequency range, for example, 70 MHz±18 MHz, 140 MHz±36 MHz, etc., without or with reduced errors.

2. Description of the Prior Art

The attached FIG. 1 shows a block diagram of a four-phase PSK (4-PSK) modulation apparatus of a prior art; wherein 1 indicates a phase-locked oscillator of a fixed frequency $F_1$, 2 indicates a 90° hybrid providing 0° and 90° phase shifted signals, 3 indicates a 4-PSK modulator, 4 indicates an oscillator as a channel synthesizer and 5 indicates a mixer for mixing the outputs of the 4-PSK modulator 3 and the outputs of the channel synthesizer 4.

As it is clear from the constitution shown in the FIG. 1, the 4-PSK modulator 3 modulates the fixed frequency $F_1$ by the baseband signals. The outputs of the 4-PSK modulator are then mixed down with the outputs of the channel synthesizer 4 of the frequency $F_2 \pm BW$ by the mixer 5 to give outputs of the frequency $F_0 \pm BW$ (wherein $F_0 = F_2 - F_1$). In order to enable correction of any errors such as the amplitude error ($\Delta AM$), the orthogonality error ($\Delta \phi$) and the offset error (x), (y) as illustrated in FIG. 2, it was required to make the 4-PSK modulation at a fixed frequency $F_1$, because these errors become too large and complicated to adjust, if the 4-PSK modulation is made at the final frequency $F_0 \pm BW$ in a wider range.

For this reason, the prior art 4-PSK modulation apparatus had to employ a system of mixing down the 4-PSK modulated and corrected outputs of the fixed-frequency oscillator with the outputs of the channel synthesizer. Hence it had problems of (a) high spurious outputs, (b) need of two oscillators and (c) complicated constitution causing a large volume and a high cost.

SUMMARY OF THE INVENTION

An object of the present invention is, therefore, to solve the above problems and to provide a novel 4-PSK modulation apparatus which can be used in a wide range of frequencies without or with reduced amplitude error, orthogonality error and offset error and moreover can be made to have low spurious outputs, a small volume and a low cost.

In the present invention, a multi-phase PSK modulation apparatus comprises:

(a) multi-phase PSK modulation means responsive to baseband signals for multi-phase PSK modulating two carrier waves which are different from each other in phases for about 90°; and (b) baseband signal modification means for modifying the baseband signals in accordance with the frequencies of said carrier waves to correct all or a portion of any offset error, amplitude error and orthogonality error in the outputs of the 4-PSK modulation means.

DESCRIPTION OF THE PREFERRED EMBODIMENTS

The present invention will be explained in further detail with reference to the embodiments shown in the attached drawings.

Figure 3:
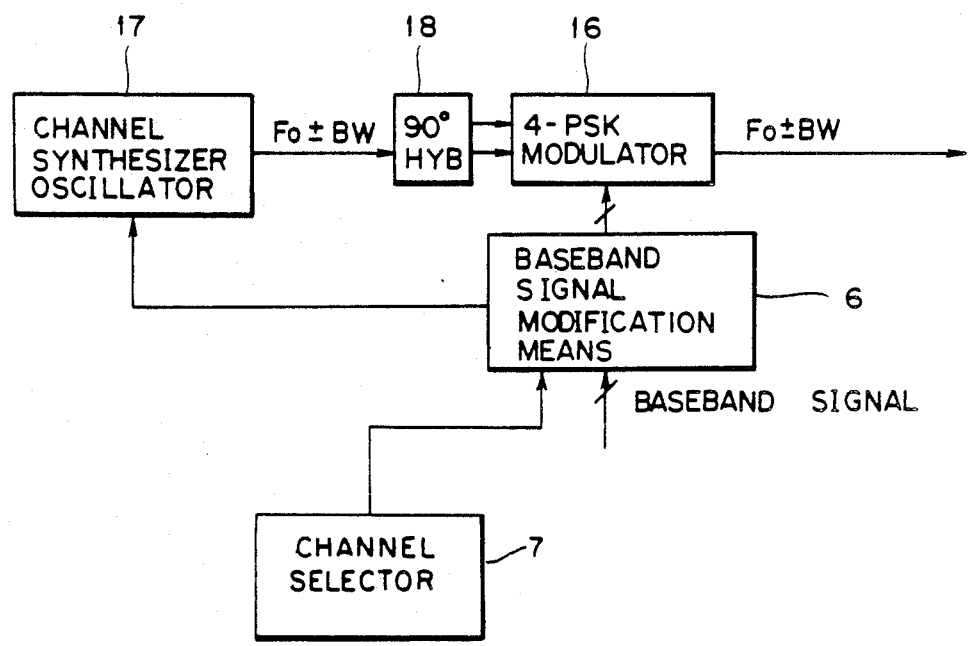
FIG. 3 shows a block diagram of a 4-PSK modulation apparatus of an embodiment of the present invention.
Figure 4:
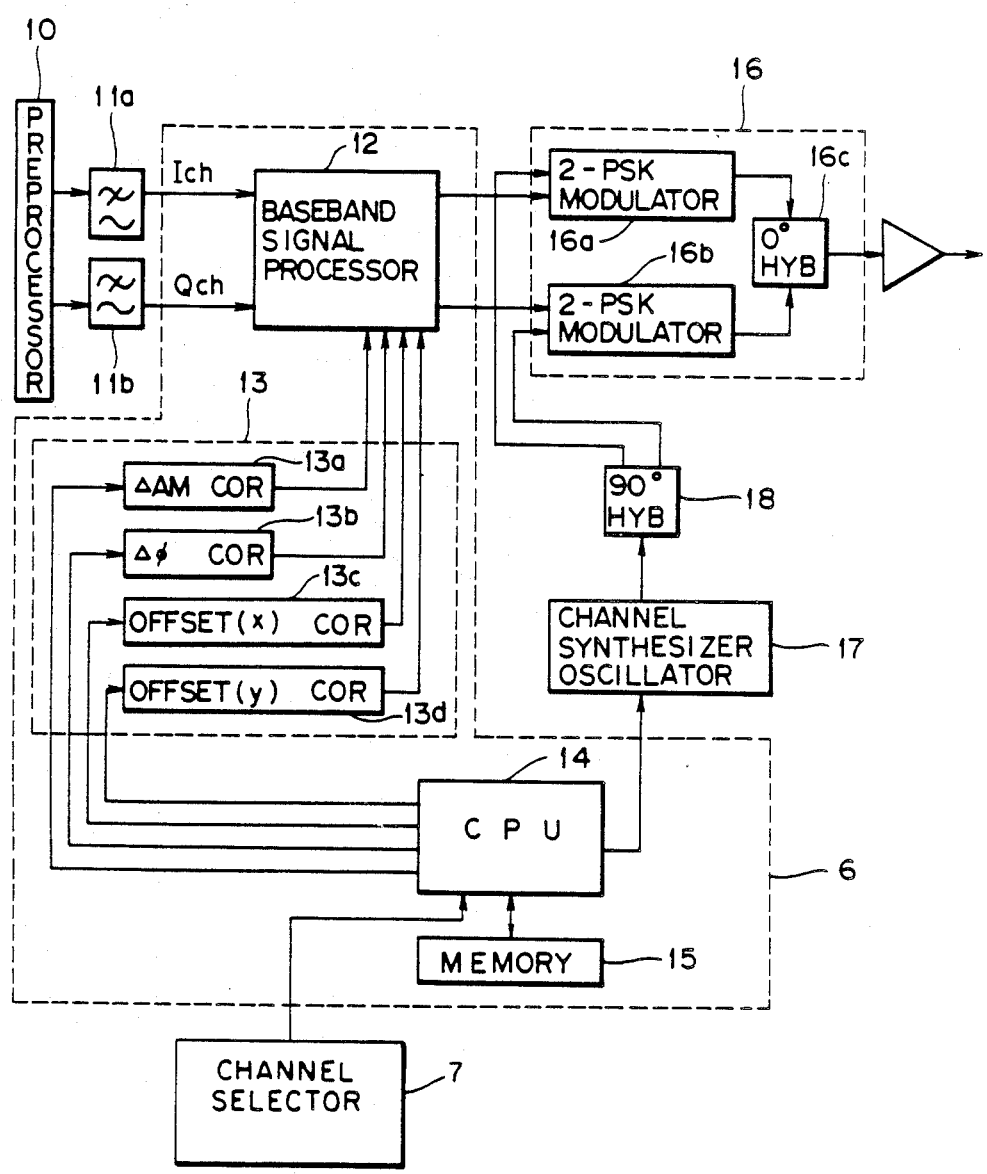
FIG. 4 shows a more detailed brock diagram of the embodiment shown in FIG. 3.

The 4-PSK modulator of an embodiment of the present invention is shown in FIGS. 3 and 4. FIG. 4 is the more specific illustration as compared to FIG. 3. In FIG. 3, 6 indicates baseband signal modification means comprising the baseband signal processor 12, the correction network 13, the CPU 14 and the memory 15 shown in FIG. 4. In these FIGS. 3 and 4, baseband signals output by a baseband signal preprocessor 10 in two channels I and Q are, through low-pass tilters 11a, 11b which allow only the low frequency components of the baseband signals to pass therethrough, input to the baseband signal processor 12. To the baseband signal processor 12, the corrective network 13 comprising an amplitude error ($\Delta AM$) correction circuit 13a, an orthogonality error ($\Delta \phi$) correction circuit 13b, an offset (x) correction circuit 13c and an offset (y) correction circuit 13d is connected. This corrective network 13 is controlled by the central processing unit (CPU) 14 to which the memory 15 storing modification data corresponding to modulation frequencies is connected. The baseband signals are modified in accordance with the modulation frequencies by means of the correction circuits 13a to 13d, the CPU 14 and the memory 15. The modified baseband signals output by the baseband signal processor 12 are input to a 4-PSK modulator 16 to which an output of a channel synthesizer 17 and an output of a 90° hybrid 18 receiving a portion of the output of the channel synthesizer 17 and shifting its phase for 90° are supplied. The channel synthesizer 17, which generates a carrier wave of a variable frequency, is connected to the CPU 14 and is controlled thereby as to the frequencies. The 4-PSK modulator 16 comprises two two-phase PSK (2-PSK) modulators 16a and 16b and a 0° hybrid (or combiner) 16c.

Figure 1:
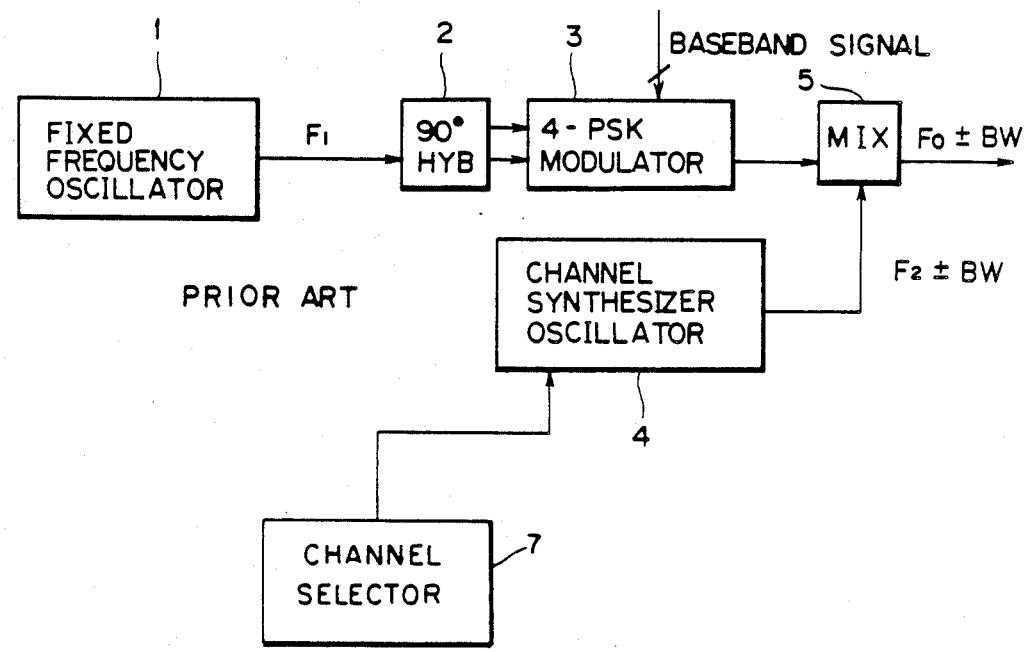
FIG. 1 shows a block diagram of a 4-PSK modulation apparatus of a prior art.
Figure 2:
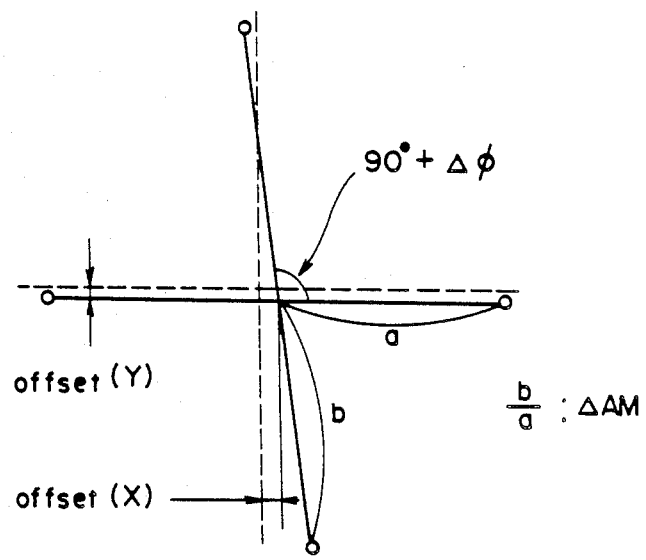
FIG. 2 shows a diagram explaining errors that may occur in a 4-PSK modulator.

Previously, data corresponding to the modification amounts of respective errors in accordance with the frequencies are stored in the memory 15. The CPU 14 controls the frequencies of the channel synthesizer 17 and also reads out the data of the modification amounts corresponding to the frequencies. The read out modification data are transmitted to the correction circuits 13a to 13d which then convert the modification data to modification amounts appropriate to the baseband signals and supply them to the baseband signal processor 12. The baseband signal processor 12 modifies, on the basis of them, the input baseband signals as to the amplitude error ($\Delta AM$), the orthogonality error ($\Delta \phi$), the offset (x) and the offset (y), as shown in FIG. 2. The thus modified baseband signals are then input to a 4-PSK modulator 16 and 4-PSK modulated therein in accordance with the outputs of the channel synthesizer 17.

Figure 5:
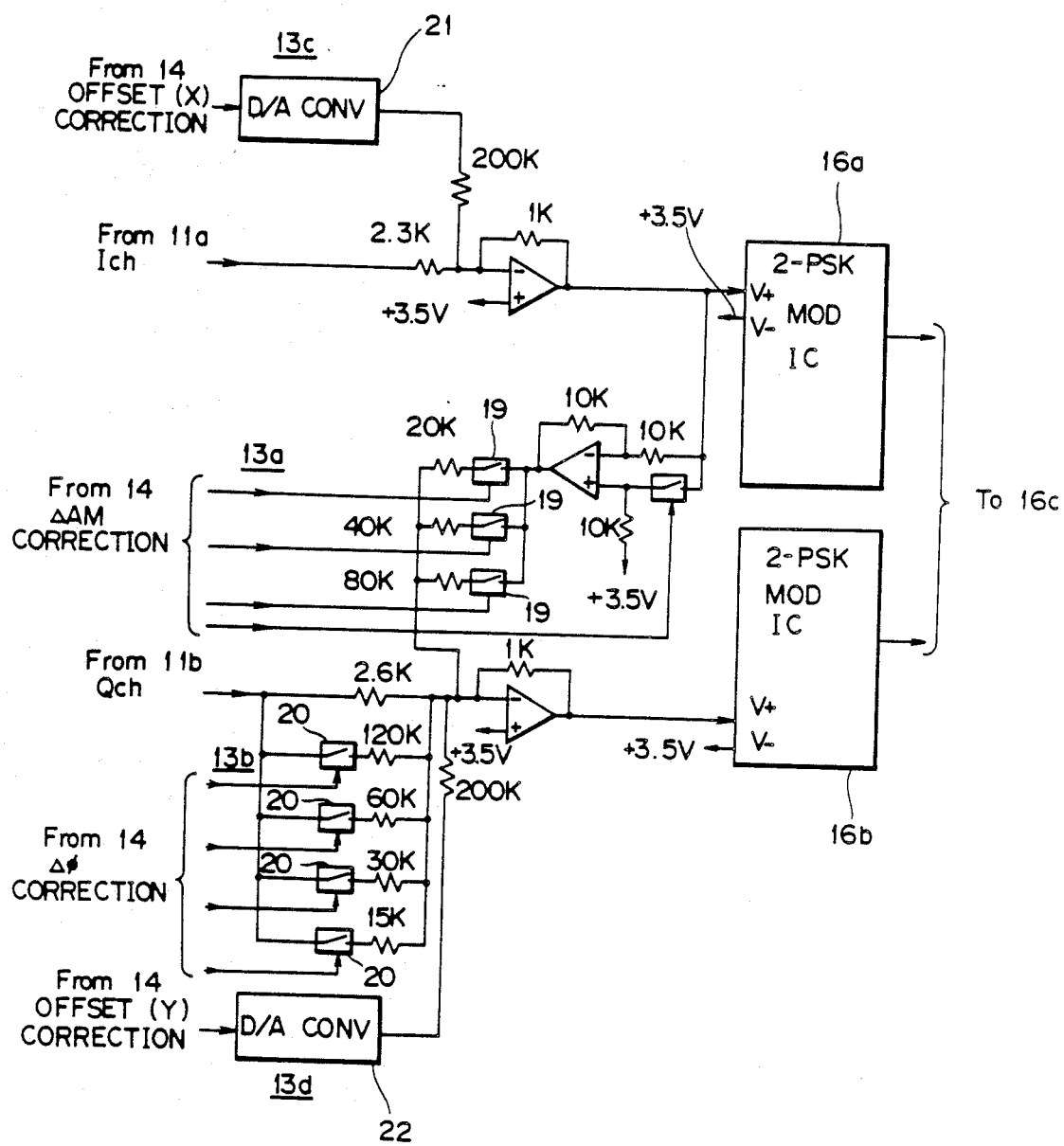
FIG. 5 shows a circuit diagram of the portion of the corrective network and the baseband signal processor shown in FIG. 3.

The details of an example of the baseband signal processor 12 and the corrective network 13 of FIG. 4 are shown in FIG. 5, wherein 19 and 20 indicate CMOS analog switches and 21 and 22 indicate digital/analog (D/A) converters. The modification data read out by the CPU 14 in FIG. 4 on the amplitude error ($\Delta AM$), the orthogonality error ($\Delta \phi$), the offset (x) and the offset (y) are given to the CMOS analog switches 19 and 20 and D/A converters 21 and 22. More particularly, the modification data on the amplitude error ($\Delta AM$) and the orthogonality error ($\Delta \phi$) are given to the CMOS analog switches 19 and 20 and control ON/OFF thereof to make out the modification amount as combinations of the resistors as selected. On the other hand, the modification data on the offsets are given to the D/A converters 21 and 22 and converted thereby to the modification amounts in analog amounts.

Although the present invention has been explained in detail as above with reference to a specific embodiment, the present invention is not limited thereby in any way and includes various changes and modifications within the scope of the spirit of the present invention. For example, the control of the modification amount in accordance with the frequencies is effected by the CPU in the above embodiment, but it is also possible to employ a simpler consitution wherein plural sets of resistor units each having a predetermined resistance are prepared and selected or interchanged in accordance with the frequencies.

It is thus clear that the present invention enables to correct the amplitude error ($\Delta AM$), the orthogonality error ($\Delta \phi$), the offset (x) and the offset (y) errors in accordance with the frequencies and thus to nullify or reduce these errors over a wide range of frequencies by a rather simple constitution, whereby to reduce spurious outputs, volume and cost of the apparatus.

I claim:

1. A four-phase PSK modulation apparatus comprising:
   (a) a four-phase PSK modulator comprising two sets of two-phase PSK modulators and a combiner to in-phase synthesize outputs thereof, for four-phase PSK modulating two carrier waves input to the two-phase PSK modulators by baseband signals respectively input to the two-phase PSK modulators, said two carrier waves having the same frequency but being different from each other in phases for 90°;
   (b) a channel synthesizer for generating a carrier wave of a variable frequency;
   (c) a 90° hybrid for receiving the carrier wave generated by the channel synthesizer, generating the two carrier waves, and transmitting them to the four-phase PSK modulator;
   (d) a memory for storing modification data corresponding to various frequencies of the carrier waves;
   (e) a central processing unit for receiving a frequency selection signal from a channel selector and controlling the variable frequency of the carrier wave to be generated by the channel synthesizer to the selected frequency and reading out from the memory the modification data corresponding to the selected frequency;
   (f) a corrective network for controlling amounts of modification to be added to the baseband signal with respect to an offset error, an amplitude error and an orthogonality error in outputs of the four-phase PSK modulator, in response to the modification data read out by the central processing unit; and
   (g) a baseband signal process for adding to the baseband signals the modifications in the amounts controlled by the corrective network and transmitting the modified baseband signals to the four-phase PSK modulator.

* * * * *